United States Patent Office 3,716,633
Patented Feb. 13, 1973

3,716,633
VINYL ACETATE-CROTONIC ACID-UNSATU-RATED ESTER OR ETHER POLYMERS IN HAIR LACQUERS AND SETTING LOTIONS
Andre Viout and Regine Pasero, Paris, France, assignor to Societe Anonyme dite: l'Oreal, Paris, France
No Drawing. Continuation-in-part of applications Ser. No. 530,395, Feb. 8, 1964, and Ser. No. 655,770, July 25, 1967. This application July 25, 1968, Ser. No. 747,470
Claims priority, application France, Mar. 3, 1965, 7,787; Jan. 27, 1966, 47,441; Aug. 3, 1966, 71,998; Luxembourg, July 28, 1967, 54202
The portion of the term of the patent subsequent to May 18, 1988, has been disclaimed
Int. Cl. A61k 7/00
U.S. Cl. 424—47          3 Claims

ABSTRACT OF THE DISCLOSURE

Copolymers of (a) vinyl acetate, (b) crotonic acid and (c) unsaturated esters or ethers in cosmetic hair treating compositions.

---

This application is a continuation-in-part of U.S. application 530,395 filed Feb. 28, 1966, now abandoned; and 655,770 filed July 25, 1967 now U.S. Pat. 3,579,629 patented May 18, 1971.

Both natural and synthetic resins, usually in aqueous or hydro-alcoholic solution, are in current use as hair lacquers or setting lotions.

The object of such use is to hold the coiffure in a desired shape and improve its appearance, particularly by imparting a desirable sheen thereto.

Among the resins heretofore used for this purpose are homopolymers such as polyvinylpyrrolidone, copolymers such as a vinylpyrrolidone/vinyl acetate copolymer, acrylic ester/unsaturated monoethylene acetate copolymers, esterified or amidified vinyl alkyl ether/maleic anhydride copolymers, as well as copolymers of vinyl acetate and unsaturated monoethylene acids such as crotonic acid.

The present invention relates to new copolymers which make it possible to prepare cosmetic compositions of better quality than those heretofore known.

The copolymers according to the invention make it possible to prepare hair lacquers or setting lotions which form films which hold the coiffure in shape much better than those made from the resins heretofore used.

Moreover, the use of these polymers results in a much more rapid hardening of the coating formed thereby, so that in order to provide a given shape-holding power it is necessary to use less than half as much of the polymer according to the invention as would be necessary if a known vinyl acetate/crotonic acid polymer, for example, were used.

It follows that cosmetic compositions according to the invention yield excellent results at a lower cost.

The copolymers according to the invention also impart other valuable properties to cosmetic compositions containing them. They make is possible to produce films having a brighter sheen than the copolymers presently in use.

Moreover, they have a definite affinity for the hair, which has not only the advantage of causing the coiffure to hold its shape longer, when the new copolymers are used in setting lotions, but also that of permitting the hair to be combed without serious damage to the film formed by copolymer. It is well known that when conventional resins are employed, combing almost completely removes those resins, which fall out in the form of a white powder. In the case of the copolymer the copolymer according to the invention, on the contrary, combing is possible, even though the films formed by the copolymer may be easily removed by brushing or shampooing.

It is a further advantage of cosmetic compositions according to the invention that the film formed thereby is not very hygroscopic so that coiffures to which they have been applied retain their shape well even in a humid atmosphere.

Practically none of the products used hitherto is entirely satisfactory. The reason for this is that it is difficult simultaneously to achieve all the different characteristics which are desired in a lacquer or in a wave setting lotion, because these characteristics are often contradictory.

Thus it is desirable to be able to obtain a resin film on the hair which lasts well, has high brilliance and good lacquering power, but which at the same time adheres well to the hair and which has no marked tendency to flake. Furthermore the resin film, on the one hand, should not have significant hygroscopicity, otherwise the hair will become sticky in appearance, but, on the other hand, should be readily removable from the hair, by gentle brushing or by washing with any desired shampoo.

The cosmetic products known hithereto have had to have a compromise selection of the various desired properties, none of the known products effectively possessing all of the desired properties. Thus, in the past, certain properties have been deliberately chosen at the expense of other desirable properties. For example, some of the polymers used are very soluble in water. This avoids flaking of the film and allows the polymers to be easily removed by shampooing, but the polymers take up moisture and the hair rapidly becomes sticky. On the other hand, there have also been used resins which are much less hygroscopic but which give rise to the formation of white-colored scurf which is unaesthetic and which is difficult to remove with certain shampoos; furthermore these resins do not impart all the desired brillance to the hair.

The applicants, after considerable work, have succeeded in providing new synthetic resins capable of being used in aqueous alcoholic solutions as hair lacquers or hair wave setting lotions, these resins allowing each of the desirable properties indicated above to be simultaneously achieved to a considerable extent. Lotions or lacquers based on the new resins have improved properties which are readily noticeable during use, without any known defects being accentuated. Furthermore the new resins have the great advantage of being very easily removed from the hair by washing either by anionic or by cationic shampoos.

The present invention provides a new industrial product which comprises a copolymer obtained by copolymerization of vinyl acetate, crotonic acid, and at least one other polymerizable monomer chosen from the following group:

(1)          R—COOCR'=CH$_2$ in which

R is selected from the group consisting of a straight chain alkyl having 2 to 30 carbon atoms, a branch chain alkyl having 3 to 30 carbon atoms, and an alkoxyalkyl having 2 to 30 carbon atoms, R' is selected from the group consisting of hydrogen and methyl.

Preferred compounds of this type include—
Vinyl esters corresponding to the formula:

(2)          R—COOCH=CH$_2$ in which

R represents a linear or branched chain hydrocarbon having from 10 to 22 atoms of carbon.

Allylic and methallylic esters corresponding to the formula:

(3) 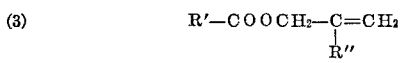

in which

R' represents a saturated linear or branched chain hydrocarbon having from 10 to 22 carbon atoms, and
R" represents hydrogen or —CH₃.

The above copolymers preferably contain from 63 to 88% by weight of vinyl acetate, from 5 to 15% and preferably from 7 to 12% of crotonic acid and from 5 to 25% of vinylic esters, allylic esters or methallylic esters.

Among the vinylic esters of this type capable of being utilized according to the invention, vinyl laurate, vinyl palmitate, vinyl stearate, vinyl isostearate, vinyl behenate, as well as others, may be mentioned.

Among the allylic and methallylic esters which can be utilized conforming to the invention, allyl laurate, methallyl laurate, allyl stearate, methallyl stearate, allyl isostearate, methallyl isostearate and allyl behenate can be mentioned by way of example.

Acrylic or methacrylic esters having the formula:

(4) 

in which R represents hydrogen or methyl and R' is an alkyl or alkoxy having 1 to 22 carbon atoms (such as methyl, butyl, ethylhexyl, butoxyethyl, lauryl).

Alkyl vinyl ethers having the formula (5) 

in which R" is a straight or branch chain alkyl or haloalkyl such as ethyl, isopropyl, butyl, isobutyl and chloroethyl, and salts of the said copolymers.

The copolymers containing monomers of Formulas 4 and 5 preferably contain 75 to 85% of vinyl acetate, 5 to 15%, preferably 7 to 10%, of crotonic acid, and 5 to 15%, preferably 10 to 15%, of component (c).

Illustrative acrylic and methacrylic esters which may be used in order to obtain the copolymers of the invention are methyl acrylate, butyl acrylate, ethylhexyl acrylate, lauryl acrylate, methyl methacrylate, butyl methacrylate, butoxyethyl methacrylate and lauryl methacrylate.

Illustrative alkyl vinyl ethers which may be used in order to obtain the copolymers of the invention are isopropyl vinyl ether, isobutyl vinyl ether, and chloroethyl vinyl ether.

In order to use the copolymers of the invention in hair lacquers or wave setting lotions it is necessary to form salts thereof by means of mineral or organic bases, so as to render copolymers soluble both in water and in organic solvents, especially in the halogenated hydrocarbons currently used as aerosol propellants. Illustrative suitable bases include ammonia, mono, di and tri ethanolamine, monoethylamine, limethylamine, diethylamine, aminoethylamine, monoisopropanolamine, 2-amino-2-methyl-propanol-1, 2-amino-2-methyl-propanediol-1,3 and morpholine. The amounts of base used may vary between rather wide limits, for example between 10 and 150% and preferably 50 to 100% relative to the theoretical amount required for neutralization, without affecting the desired result. Advantageously, an equimolecular quantity of the base relative to the amount of crotonic acid contained in the copolymer is used.

The present invention therefore also includes cosmetic products essentially characterized by the fact that they contain at least one salt of a copolymer of the invention in solution having a pH of 2.5 to 10.

The cosmetic product of the invention may for example be a hair lacquer obtained by dissolving one or several salts of the copolymers of the invention in an alcohol. Suitably, this alcoholic solution mixed with a propellant gas liquified under pressure, is charged into an aerosol container. For example, an aerosol lacquer of the invention may be obtained by adding, to a mixture consisting of 25 to 33 parts by weight of an anhydrous aliphatic alcohol such as ethanol or isopropanol and 66 to 75 parts by weight of a propellant gas or a mixture of propellant gases such as halogenated hydrocarbons, 1 to 4% by weight of one or several salts of copolymers of the invention.

The cosmetic product of the invention may also for example be a wave setting lotion obtained by dissolving, in an aqueous alcoholic solution containing 20 to 50% of alcohol, 1 to 3% by weight of the solution of a salt of a copolymer, or of a mixture of salts of copolymers of the invention.

It is to be understood that auxiliary materials such as plasticizers, perfumes, dyestuffs or any other auxiliary agent normally used in cosmetics, may be added if desired to the cosmetic products of the invention.

The copolymers of the invention are of great interest when used in the cosmetic field because they have very good film-forming properties, they are not sensitive to the effect of humidity, and they leave the hair very glossy. Furthermore it is remarkable that they can be easily removed by brushing or washing and that they have no tendency to scurf when applied to hair.

The precise proportions, relative to vinyl acetate, of the crotonic acid and of the ester and/or ether depend upon the particular desired cosmetic application. The following discussion illustrates the factors to be taken into account.

A reduction of the proportion of crotonic acid in the copolymer results in a reduction of the solubility of the copolymer salt in water or in alcohol, which can limit its possible application and renders its removal by washing more difficult. On the other hand, if the proportion of crotonic acid in the copolymer is excessively increased the copolymer salt tends to become sticky, in proportion to the increase in its hygroscopicity. Also, an increase in the proportion of ester and/or ether results in an increase of the hardness of the copolymer salt and it tends to become insoluble in water. Conversely, if the amount of ester and/or ether is decreased then the gloss and the hardness of the film covering the hair is simultaneously diminished.

The copolymers of the invention have the important advantage over known copolymers of having a smaller "moisture regain" when placed in a humid air environment. In order to demonstrate this characteristic the applicants have carried out comparative measurements of moisture regain of two films in an atmosphere of 81.5% relative humidity.

The first film consisted of a copolymer of the invention having the composition:

| | Percent |
|---|---|
| Vinyl acetate | 80 |
| Crotonic acid | 10 |
| Methyl methacrylate | 10 |

The second film consisted of a commercially available copolymer having the composition:

| | Percent |
|---|---|
| Vinyl acetate | 90 |
| Crotonic acid | 10 |

The percentage humidity regain at equilibrium is 17.8% for the copolymer of the invention and 22.8% for the other copolymer. There is thus a practical improvement in the hygroscopicity of the film of about 20%.

The copolymers of the invention may be prepared by various methods such as bulk polymerization, solution polymerization or suspension polymerization in solvents such as alcohols or benzene. Suspension polymerization is preferred, however, as it enables the copolymer to be obtained in the form of beads which are easily separated off, washed and dried.

Polymerization in suspension which permits obtaining the copolymer in the form of fine particles is effected in water in the presence of a protective colloid such as polyvinylic alcohol, or polyacrylic acid (product known as Carbopol) or hydroxyethylcellulose (sold under the trademark Cellosize).

When the polymerization is carried out in suspension in water, in the presence of a protective colloid, a catalyst and a chain length regulator, about 2 to 3 parts by weight of the monomers are used for 4 to 5 parts by weight of water. The concentration of protective colloid may vary for example between 0.06% and 1% relative to the weight of the aqueous phase.

The catalysts may be used in proportions of 1 to 5% by weight and preferably 1.5 to 3% by weight relative to the monomers. Suitable catalysts include benzoyl peroxide, lauryl peroxide and azobisisobutyronitrile.

Suitable chain length regulators, include butylmercaptan or laurylmercaptan, which may be used in concentrations of about 0.25 to 0.70% by weight relative to the monomers used.

The following non-limitative examples further illustrate the invention.

EXAMPLE 1

Preparation of a copolymer of 80% vinyl acetate, 10% crotonic acid and 10% methyl methacrylate.

1800 g. of an aqueous solution containing 0.06% of Carbopol (neutralized to pH 7 by N/2 NaOH) are placed in a 6 litre flask fitted with a stirrer, a reflux condensor, a thermometer and a nitrogen inlet tube.

After flushing with nitrogen the following mixture of monomers is introduced with stirring:

| | G. |
|---|---|
| Vinyl acetate | 960 |
| Methyl methacrylate | 120 |
| Crotonic acid | 120 |
| Azobisisobutyronitrile | 22.2 |
| Laurylmercaptan | 8.4 |

The mixture is heated to reflux with stirring while constantly maintaining the flow of nitrogen. The temperature remains at 69° for about 4 hours and then rises progressively to 90°. This temperature is maintained for one hour in order to complete the polymerization and the mixture then is deodorized by removing the residual monomers. After cooling, the product is filtered off, washed and dried, initially at room temperature and subsequently at 50°. The copolymer is obtained in the form of transparent beads in a yield of 86%.

EXAMPLE 2

Preparation of a copolymer of 80% vinyl acetate, 10% crotonic acid, and 10% isobutyl vinyl ether.

7500 g. of a 1% aqueous solution of Cellosize (hydroxyethyl cellulose) is placed in a 20 litre glass reactor equipped with an anchor-shaped stirrer, a reflux condenser, a thermometer and a nitrogen inlet tube. The solution is purged with a current of nitrogen and the following monomer mixture is introduced with stirring:

| | G. |
|---|---|
| Vinyl acetate | 2,400 |
| Isobutyl vinyl ether | 300 |
| Crotonic acid | 300 |
| Azobisisobutyronitrile | 45 |
| Laurylmercaptan | 7.5 |

The duration of the polymerization, carried out as in Example 1, is of the order of 11 to 12 hours.

After filtering, washing and drying, the copolymer is obtained in the form of beads in a yield of 77%.

EXAMPLE 3

Preparation of a copolymer of 75% vinyl acetate, 10% crotonic acid, 10% isobutyl vinyl ether, and 5% lauryl methacrylate.

The desired copolymer is obtained in a yield of 75% under the same conditions as those described in Example 2, by copolymerizing 75 g. of vinyl acetate, 10 g. of crotonic acid, 10 g. of isobutyl vinyl ether and 5 g. of lauryl methacrylate.

EXAMPLE 4

Preparation of a copolymer of 83% vinyl acetate, 10% methyl methacrylate and 7% crotonic acid.

400 g. of an 0.06% aqueous solution of Carbopol (neutralized to pH 7 by means of N/2 caustic soda) are placed in a flask equipped with a stirrer, a reflux condenser, a thermometer and a nitrogen inlet tube.

After flushing with nitrogen the following mixture is introduced with stirring:

| | G. |
|---|---|
| Vinyl acetate | 249 |
| Methyl methacrylate | 30 |
| Crotonic acid | 21 |
| Azobisisobutyronitrile | 2.35 |
| Lauryl peroxide | 2.35 |
| Butylmercaptan | 1.4 |

The mixture is heated to reflux under nitrogen, with stirring. The temperature rises to 90–92°, after having remained at a 68° stage for 4 hours.

When the polymerization is complete the mixture is cooled and the product filtered off, washed and dried.

The copolymer is obtained in the form of transparent beads, in a yield of 70%.

EXAMPLE 5

Preparation of a copolymer of 84% vinyl acetate, 6% lauryl methacrylate, 3% lauryl acrylate and 7% crotonic acid.

400 g. of an aqueous 0.06% Carbopol solution (neutralized to pH 7 by means of N/2 caustic soda) are introduced into a flask fitted with a stirrer, a reflux condenser, a thermometer and a nitrogen inlet tube.

The solution is purged with nitrogen and the following mixture introduced with stirring.

| | G. |
|---|---|
| Vinyl acetate | 252 |
| Lauryl methacryate | 18 |
| Lauryl acrylate | 9 |
| Cotonic acid | 21 |
| Azobisisobutyronitrile | 2.35 |
| Lauryl peroxide | 2.35 |
| Laurylmercaptan | 0.9 |

The mixture is heated to reflux. The polymerization is complete after about 10 hours.

After cooling the product is filtered off, washed and dried. The copolymer is obtained in the form of beads in a yield of 86%.

EXAMPLE 6

Preparation of a copolymer of 80% vinyl acetate, 5% methyl methacrylate, 5% methyl acrylate and 10% crotonic acid.

600 g. of an 0.06% aqueous solution of Carbopol (neutralized to pH 7 by N/2 strength caustic soda) are placed in a flask fitted with a stirrer, a reflux condenser, a thermometer and a nitrogen inlet tube.

The solution is purged with nitrogen and the following mixture introduced with stirring.

| | G. |
|---|---|
| Vinyl acetate | 320 |
| Methyl acrylate | 20 |
| Methyl methacrylate | 20 |
| Crotonic acid | 20 |
| Azobisisobutyronitrile | 7.4 |
| Laurylmercaptan | 0.25 |

After polymerization, transparent beads are obtained in a yield of 80%.

EXAMPLE 7

Preparation of a copolymer of 75% vinyl acetate, 10% methyl methacrylate, 5% lauryl methacrylate and 10% crotonic acid.

The desired copolymer is obtained in a yield of 78% under the same conditions as those described in Example 6, by copolymerizing 300 g. of vinyl acetate, 40 g. of methyl methacrylate, 20 g. of lauryl methacrylate and 40 g. of crotonic acid.

EXAMPLE 8

Preparation of a copolymer of 84% vinyl acetate, 6% butyl methacrylate, 3% butyl acrylate and 7% crotonic acid.

The desired copolymer is obtained in a yield of 68% under the same conditions as those described in Example 4, by copolymerizing 252 g. of vinyl acetate, 18 g. of butyl methacrylate, 9 g. of butyl acrylate and 21 g. of crotonic acid.

EXAMPLE 9

Preparation of a copolymer of 84% vinyl acetate, 6% lauryl methacrylate, 3% methyl methacrylate and 7% crotonic acid.

The desired copolymer is obtained in a yield of 65% under the same conditions as those described in Example 4, by copolymerizing 252 g. of vinyl acetate, 18 g. of lauryl methacrylate, 9 g. of methyl methacrylate and 21 g. of crotonic acid.

EXAMPLE 10

Preparation of a copolymer of 80% vinyl acetate, 10% of 2-ethylhexyl acrylate and 10% crotonic acid.

600 g. of an aqueous 0.06% solution of Carbopol (neutralized to pH 7 by means of N/2 caustic soda are introduced into a flask fitted with a stirrer, a reflux condenser, a thermometer and a nitrogen inlet tube.

The solution is purged with nitrogen and the following monomer mixture is added with stirring.

|  | G. |
|---|---|
| Vinyl acetate | 240 |
| 2-ethylhexyl acrylate | 30 |
| Crotonic acid | 2.6 |
| Azobisisobutyronitrile | 2.6 |
| Lauryl peroxide | 2.6 |
| Laurylmercaptan | 1.4 |

The polymerization is complete at the end of 11 hours of heating. The desired copolymer is obtained in a yield of 75%.

EXAMPLE 11

Preparation of a copolymer of 80% vinyl acetate, 10% of lauryl methacrylate and 10% of crotonic acid.

The desired copolymer is obtained in a yield of 85% under the same conditions as those described in Example 10, by copolymerizing 240 g. of vinyl acetate, 30 g. of lauryl methacrylate and 30 g. of crotonic acid.

EXAMPLE 12

Preparation of a copolymer of 75% vinyl acetate, 10% of methyl methacrylate, 5% of lauryl methacrylate and 10% of crotonic acid.

The desired copolymer is obtained in a yield of 84% by working under the same conditions as those described in Example 6, but with 800 g. of the aqueous phase instead of 600 g.

EXAMPLE 13

Preparation of a copolymer of 80% vinyl acetate, 10% of butoxyethyl methacrylate and 10% of crotonic acid.

450 g. of a 1% aqueous solution of Cellosize are introduced into a flask fitted with a stirrer, a reflux condenser, a thermometer and a nitrogen inlet tube.

The solution is purged by means of a stream of nitrogen and the following mixture of monomers introduced with stirring.

|  | G. |
|---|---|
| Vinyl acetate | 160 |
| Butoxyethyl methacrylate | 20 |
| Crotonic acid | 20 |
| Azobisisobutyronitrile | 3.7 |
| Laurylmercaptan | 0.6 |

The mixture is heated to reflux point with stirring. The duration of the polymerization is of the order of 11 hours.

After cooling the copolymer is filtered off, washed and dried. The desired polymer is obtained in the form of transparent beads, in a yield of 70%.

EXAMPLE 14

Prepartion of a copolymer of 80% vinyl acetate, 10% chloroethyl vinyl ether and 10% of crotonic acid.

The desired copolymer is obtained in a yield of 73% under the same conditions as those described in Example 12, by copolymerizing 160 g. of vinyl acetate, 20 g. of chloroethyl vinyl ether and 20 g. of crotonic acid.

EXAMPLE 15

Preparation of copolymer in suspension: vinyl acetate 75%, crotonic acid 10%, vinyl stearate 5%.

There is placed in a vessel fitted with an agitator, a reflux refrigerant, a thermometer, and a nitrogen conveying tube, 400 grams of an aqueous hydroxyethylcellulose solution known under the trademark Cellosize at a 1% concentration.

|  | G. |
|---|---|
| Vinyl acetate | 225 |
| Crotonic acid | 30 |
| Vinyl stearate | 45 |
| Azobisisobutyronitrile | 3.75 |

It is brought to reflux with stirring and under nitrogen. After about 8 hours the polymerization is ended.

It is allowed to cool, dried in air, and heat dried. The copolymer is obtained which is in the form of fine particles with a yield of 85%.

By way of example and to show the weak hygroscopicity of polymers according to the invention, there will be prepared in identical manner three films to be placed for 24 hours in an atmosphere having a relative humidity of 80%. After which is measured the quantity of water absorbed with respect to the initial weight of the film.

The first film which is constituted by a polyvinylpyrrolidone/vinyl acetate copolymer took up 28% of water.

The second film which is constituted by a vinyl acetate crotonic acid copolymer absorbed 15% of water.

Finally, the third copolymer which is that described in the preceding example, took up only 11% of water.

Thus it is seen that it presents a weak hydgroscopicity with respect to the other known polymers.

EXAMPLE 16

Prepartion of a copolymer in mass of vinyl acetate 80%, crotonic acid 10%, vinyl stearate 10%.

There is placed in a 500 cc. reactor fitted with an agitator, thermometer, reflux refrigerant and nitrogen supply tube, the following mixture of monomers:

|  | G. |
|---|---|
| Vinyl acetate | 160 |
| Crotonic acid | 20 |
| Vinyl stearate | 20 |
| Benzoyl peroxide | [1] 2.35 |

[1] 85% pure.

The above mixture is heated at reflux under agitation and under nitrogen.

In the course of polymerization the mixture thickens and when polymerization is terminated, after five or six hours, the polymer appears in the form of a solid mass which is evacuated hot.

Through cooling there is obtained with a quantitative yield, a slightly yellow colored transparent product which can be reduced to a powder.

EXAMPLE 17

Preparation of a copolymer in mass of 70% vinyl acetate, 10% crotonic acid, 20% vinyl stearate.

The procedure is the same as that of Example 16.

In the same way a quantitative yield of a light yellow colored transparent product is obtained which can be easily powdered.

EXAMPLE 18

Preparation of a copolymer in mass of 75% vinyl acetate, 10% crotonic acid, 15% allyl stearate.

The procedure is the same as that of Example 16.

A quantitative yield of an easily powdered transparent product is obtained.

EXAMPLE 19

Preparation of a copolymer in mass of 75% vinyl acetate, 10% crotonic acid, 15% vinyl stearate.

The procedure is the same as that of Example 16.

A quantitative yield of an easily powdered transparent product is obtained.

EXAMPLE 20

Preparation of a particulate copolymer of 71.5% vinyl acetate, 8.5% crotonic acid, 20% vinyl laurate.

The procedure is the same as that described in Example 15.

An 85% yield of the desired copolymer is obtained.

EXAMPLE 21

Preparation of a particulate copolymer, 75% vinyl acetate, 10% crotonic acid, 15% allyl laurate.

The procedure is the same as described in Example 15.

A 75% yield of the desired polymer is obtained.

EXAMPLE 22

Preparation of a particulate copolymer of 75% vinyl acetate, 10% crotonic acid, 15% allyl isostearate.

The procedure is the same as that described in Example 15.

A 63% yield of the desired copolymer is obtained.

EXAMPLE 23

Preparation of a particulate copolymer of 75% vinyl acetate, 10% crotonic acid, 15% methallyl stearate.

The procedure is the same as that described in Example 15.

A 62% yield of the desired copolymer is obtained.

EXAMPLE 24

Preparation of a particulate copolymer of 75% vinyl acetate, 10% crotonic acid, 15% vinyl isostearate.

The procedure is the same as that described in Example 15.

A 75% yield of the desired copolymer is obtained.

EXAMPLES OF APPLICATION

EXAMPLE 25

To form an aerosol hair lacquer, a solution having the following composition is prepared:

| | G. |
|---|---|
| Copolymer described in Example 16 | 8 |
| 2-amino 2-methyl 1-propanol | 0.89 |
| Diethyl adipate | 0.20 |
| Perfume | 0.5 |
| Absolute ethyl alcohol, q.s.p. | 100 |

25 grams of this solution is conditioned in an aerosol bomb with 45 grams of product known as Freon 11, trichloromonofluoromethane, and 30 grams of the product known as Freon 12 dichlorodifluoromethane.

By pulverization a lacquer insuring excellent holding of the hair-do is obtained.

EXAMPLE 26

To form an aerosol lacquer, a solution having the following composition is prepared:

| | G. |
|---|---|
| Copolymer described in Example 16 | 4 |
| 2- amino 2-methyl 1-propanol | 0.45 |
| Ethyl phthalate | 0.2 |
| Perfume | 0.2 |
| Absolute ethyl alcohol, q.s.p. | 100 |

30 grams of this solution is introduced into an aerosol bomb with 42 grams of the product labelled Freon 11 and 28 grams of Freon 12.

After application on the hair, the films are brilliant and not hygroscopic.

EXAMPLE 27

To form an aerosol hair lacquer, a solution having the following composition is prepared:

| | G. |
|---|---|
| Copolymer described in Example 15 | 6 |
| 2-amino 2-methyl 1-propanol | 0.7 |
| Ethyl Cellosolve (2-ethoxyethanol) | 0.3 |
| Perfume | 0.3 |
| Absolute ethyl alcohol, q.s.p. | 100 |

To 25 grams of this solution is added 45 grams of Freon 11 and 30 grams of Feron 12 and the mixture is conditioned in an aerosol bomb.

This compound is particularly suitable for a lacquer.

EXAMPLE 28

To form an aerosol hair lacquer, a solution having the composition is prepared:

| | G. |
|---|---|
| Copolymer described in Example 17 | 4 |
| Isopropyl palmitate | 0.2 |
| 2-amino 2-methyl 1-propanol | 0.45 |
| Perfume | 0.2 |
| Absolute ethyl alcohol, q.s.p. | 100 |

30 grams of this solution is conditioned with 42 grams of Freon 11 and 28 grams of Freon 12.

By pulverization a lacquer giving particular brilliance to the hair is obtained.

In the following examples "Alcohol" refers to ethyl alcohol and "°" signifies alcoholic degree which corresponds to the quantity of alcohol expressed in grams of alcohol per 100 grams of aqueous alcohol solution; therefore 60° represents 60 grams of absolute alcohol and 40 grams of water.

EXAMPLE 29

A hair setting lotion is obtained according to the invention by forming a solution having the following composition:

| | | |
|---|---|---|
| Copolymer described in Example 15 | g | 1.8 |
| Triethanolamine (about pH 7) | g | 0.184 |
| Trimethyl cetyl ammonium bromide | g | 0.1 |
| Water soluble silicon oil | g | 0.3 |
| Alcohol, q.s.p. | deg | 60 |
| Water, q.s.p. | cc | 100 |

After shampooing and drying the hair, 20 cc. of this solution is applied and the locks of hair are rolled up so as to set the curls in the usual manner. When this is done it is determined that the hair has sufficient stiffening, that its brilliance and combing out are remarkable and that the duration of this coiffure is superior to that obtained with conventional hair setting lotions.

EXAMPLE 30

A setting lotion is prepared according to the invention which has the following composition:

| | | |
|---|---|---|
| Copolymer described in Example 17 | g | 4 |
| Monoethanolamine (about 7.6 pH) | g | 0.20 |
| Alcohol, q.s.p. | deg | 45 |
| Water, q.s.p. | cc | 100 |

After application it is determined that the hair is lively, shiny and not sticky.

EXAMPLE 31

A setting is done in the conventional manner with a solution having the following composition:

| | |
|---|---|
| Copolymer according to Example 16 _____g__ | 1 |
| Triisopropanolamine _____g__ | 0.175 |
| Alcohol, q.s.p. _____deg__ | 65 |
| Water, q.s.p. _____cc__ | 100 |

An immediate strengthening of the hair is noted, a fine shine and an excellent holding of the set.

EXAMPLE 32

Excellent sets are obtained, particularly as concerns immediate strengthening and brilliance by utilizing a setting solution of the following composition:

| | |
|---|---|
| Copolymer according to Example 17 _____g__ | 1.2 |
| 2-amino 2-methyl 1,3-propane-diol _____ | 0.234 |
| Isopropyl alcohol, q.s.p. _____deg__ | 70 |
| Water, q.s.p. _____cc__ | 100 |

EXAMPLE 33

The following solution is prepared:

| | G. |
|---|---|
| Copolymer of Example 4 _____ | 8 |
| 2-amino-2-methyl-propanediol-1,3 _____ | 0.797 |
| Ethyl alcohol, to make up to _____ | 100 |

25 g. of this solution are introduced into an aerosol container together with 45 g. of Freon 11 and 30 g. of Freon 12.

Hair sprayed with the aerosol composition is glossy and non-sticky, and the lacquer is satisfactorily removed by brushing.

EXAMPLE 34

The following solution is prepared:

| | G. |
|---|---|
| Copolymer of Example 5 _____ | 8 |
| 2-amino-2-methyl-propanediol-1,3 _____ | 0.753 |
| Ethyl alcohol, to make up to _____ | 100 |

25 g. of this solution are introduced into an aerosol container together with 45 g. of Freon 11 and 30 g. of Freon 12.

This composition is particularly suitable as a hair lacquer.

EXAMPLE 35

The following solution is prepared:

| | G. |
|---|---|
| Copolymer of Example 1 _____ | 8 |
| 2-amino-2-methyl-propanol-1 _____ | 0.88 |
| Butyl phthalate _____ | 1.60 |
| Ethyl alcohol, to make up to _____ | 100 |

45 g. of Freon 11 and 30 g. of Freon 12 are added to 25 g. of this solution and the mixture is introduced into an aerosol container.

On spraying the composition onto hair, a lacquer film is obtained which holds the hair style very well, and which is very easily removed by brushing as well as by washing.

EXAMPLE 36

The following solution is prepared:

| | G. |
|---|---|
| Copolymer of Example 6 _____ | 12 |
| 2-amino-2-methyl-propanol-1 _____ | 0.700 |
| Ethyl alcohol, to make up _____ | 100 |

33 g. of this solution are introduced into an aerosol container together with 33 g. of Freon 11 and 33 g. of Freon 12. The films obtained on spraying are glossy and non-hygroscopic.

EXAMPLE 37

The following solution is prepared:

| | G. |
|---|---|
| Copolymer of Example 7 _____ | 8 |
| 2-amino-2-methyl-propanol-1 _____ | 0.85 |
| Isopropyl plamitate _____ | 0.50 |
| Triethylene glycol _____ | 0.10 |
| Ethyl alcohol, to make up to _____ | 100 |

45 g. of Freon 11 and 30 g. of Freon 12 are added to 25 g. of this solution and this mixture is introduced into an aerosol container.

This composition is particularly suitable as a lacquer. It leaves the hair glossy and non-hygroscopic.

EXAMPLE 38

The following solution is prepared:

| | G. |
|---|---|
| Copolymer of Example 1 _____ | 8 |
| Monomethylethanolamine _____ | 0.62 |
| Butyl carbitol (diethylene glycol monobutyl ether) __ | 0.50 |
| Ethyl alcohol, to make up to _____ | 100 |

25 g. of this solution are introduced into an aerosol container together with 45 g. of Freon 11 and 30 g. of Freon 12.

On spraying onto hair a lacquer film is obtained which imparts a high gloss to the hair.

EXAMPLE 39

The following solution is prepared:

| | G. |
|---|---|
| Copolymer of Example 2 _____ | 8 |
| Dimethylethanolamine _____ | 0.89 |
| Ethyl alcohol, to make up to _____ | 100 |

25 g. of this solution are introduced into an aerosol container together with 45 g. of Freon 11 and 30 g. of Freon 12. On spraying, a glossy hair lacquer film is obtained which is easily removed by brushing and washing.

EXAMPLE 40

The following solution is prepared:

| | G. |
|---|---|
| Copolymer of Example 3 _____ | 8 |
| Diethylethanolamine _____ | 1.28 |
| Ethyl alcohol to make up to _____ | 100 |

45 g. of Freon 11 and 30 g. of Freon 12 are added to 25 g. of this solution and the mixture introduced into an aerosol container.

The films obtained on spraying are glossy and non-hygroscopic.

EXAMPLE 41

The following solution is prepared:

| | |
|---|---|
| Copolymer of Example 1 _____g__ | 1 |
| Diisopropylamine _____g__ | 0.116 |
| Ethyl alcohol _____cc__ | 50 |
| H$_2$O to make up to _____cc__ | 100 |

This solution, when used as a wave setting lotion, leaves the hair glossy and soft. It remains active even in rather high relative humidity conditions.

EXAMPLE 42

The following solution is prepared:

| | |
|---|---|
| Copolymer of Example 2 _____g__ | 2 |
| 2-amino-2-methyl-propanol-1 _____g__ | 0.237 |
| Ethyl alcohol _____cc__ | 20 |
| H$_2$O to make up to _____cc__ | 100 |

A lotion is obtained which preserves hair waves particularly well.

EXAMPLE 43

The following solution is prepared:

| | |
|---|---|
| Copolymer of Example 3 _____g__ | 2 |
| 2-amino-2-methyl-propanol-1 _____g__ | 0.24 |
| Ethyl alcohol _____cc__ | 45 |
| H$_2$O to make up to _____cc__ | 100 |

When applied as a wave setting lotion this solution gives a non-sticky film which does not powder and which imparts a beautiful lustre to the hair.

EXAMPLE 44

The following solution is prepared:

| | G. |
|---|---|
| Copolymer of Example 8 | 6 |
| 2-amino-2-methyl-propanediol-1,3 | 0.558 |
| Ethyl alcohol to make up to | 100 |

25 g. of this solution are mixed in an aerosol container with 45 g. of Freon 11 and 30 g. of Freon 12.

The films obtained by spraying onto hair are glossy and non-hygroscopic.

EXAMPLE 45

The following solution is prepared:

| | G. |
|---|---|
| Copolymer of Example 9 | 6 |
| 2-amino-2-methyl-propanediol-1,3 | 0.576 |
| Isopropyl myristate | 0.6 |
| Ethyl alcohol to make up to | 100 |

25 g. of this solution are introduced into an aerosol container together with 45 g. of Freon 11 and 30 g. of Freon 12.

On spraying onto hair, a lacquer film is obtained which excellently preserves the hair style.

EXAMPLE 46

The following solution is prepared:

| | G. |
|---|---|
| Copolymer of Example 10 | 6 |
| 2-amino-2-methyl-propanediol-1,3 | 0.78 |
| Ethyl alcohol to make up to | 100 |

25 g. of this solution are introduced into an aerosol container together with 45 g. of Freon 11 and 30 g. of Freon 12.

Hair sprayed with this lacquer is glossy and non-sticky, and the lacquer is easily removed by brushing.

EXAMPLE 47

The following solution is prepared:

| | G. |
|---|---|
| Copolymer of Example 11 | 8 |
| 2-amino-2-methyl-propanediol-1,3 | 1.08 |
| Ethyl alcohol to make up to | 100 |

25 g. of this solution are introduced into an aerosol container together with 45 g. of Freon 11 and 30 g. of Freon 12.

Hair sprayed with the lacquer is particularly glossy.

EXAMPLE 48

The following solution is prepared:

| | G. |
|---|---|
| Copolymer of Example 12 | 8 |
| 2-amino-2-methyl-propanediol-1,3 | 0.595 |
| Ethyl alcohol to make up to | 100 |

25 g. of this solution are introduced into an aerosol container together with 45 g. of Freon 11 and 30 g. of Freon 12.

Hair sprayed with this composition is glossy and non-hygroscopic.

EXAMPLE 49

The following solution is prepared:

| | G. |
|---|---|
| Copolymer of Example 13 | 8 |
| 2-amino-2-methyl-propanol-1 | 0.848 |
| Ethyl alcohol to make up to | 100 |

25 g. of this solution are introduced into an aerosol container together wtih 47 g. of Freon 11 and 28 g. of Freon 12.

This composition is particularly suitable as a lacquer.

EXAMPLE 50

The following solution is prepared:

| | G. |
|---|---|
| Copolymer of Example 14 | 8 |
| 2-amino-2-methyl-propanol-1 | 0.888 |
| Ethyl alcohol to make up to | 100 |

25 g. of this solution are introduced into an aerosol container together with 47 g. of Freon 11 and 28 g. of Freon 12.

On spraying onto hair, a lacquer film is obtained which excellently preserves the hair style.

The present invention also more broadly relates to copolymers derived from the above copolymers as well as to cosmetic compositions containing other related monomers. Therefore, it is a further object of the present invention to provide new articles of muanfacture in the form of copolymers obtained by copolymerizing at least one monomer from each of the following groups:

The first group consists of the unsaturated alcohol esters of short chain saturated carboxylic acids having 1 to 8 carbon atoms, and the saturated alcohol esters of unsaturated carboxylic acids having 3 to 12 carbon atoms. The carbon chains present in these compounds may be interrupted by hetero atoms or divalent hetero groups, such as —O—, —S—, —NH—, and may have hydroxy groups in the $\beta$ position relative to the hetero atoms.

The second group consists of unsaturated acids having 2 to 10 carbon atoms chains which may be interrupted by hetero atoms or hetero groups such as —O—, —S—, —NH—, and may have hydroxy groups in the $\beta$ position relative to the hetero atom.

The third group consists of the esters of long chain acids having 8 to 22 carbon atoms and unsaturated alcohols, the esters of unsaturated acids of the second group and a saturated or unsaturated alcohol having a linear or branched chain comprising 8 to 18 carbon atoms or a lanolin alcohol, vinylalkyl ethers, allylalkyl ethers, methallylalkyl ethers, or crotylalkyl ethers and α-olefins.

Among the monomers of the first group which may be used to carry out the invention are the unsaturated esters of short chain carboxylic acid corresponding to the formula:

(6) 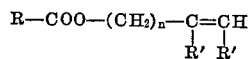

in which

R represents a linear alkyl having 1 to 4 carbon atoms,
$n$ is a number equal to 0 or 1,
R' is selected from the group consisting of H, alkyl radicals having 1 to 5 carbon atoms; and saturated short chain esters of unsaturated acids having the formula:

(7) 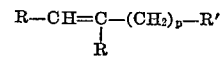

in which

R is selected from the group consisting of H and an alkyl having 1 to 5 carbon atoms;
$p$ is a whole number having a value between 0 and 10 inclusive;
R' is selected from the group consisting of COOR" and

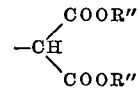

in which R" represents a saturated linear hydrocarbon radical having 1 to 8 carbon atoms.

Among the monomers of the second group, we have found particularly useful the monomers represented by the following formula:

(8) $\quad R-CH=C-(CH_2)_p-R'$
$\quad\quad\quad\quad\quad\quad |$
$\quad\quad\quad\quad\quad\quad R$ in which R is —H or an alkyl group having 1 to 5 carbon atoms;
p is a whole number between 0 and 10 inclusive;
R' is —COOH or $$-CH\begin{matrix}COOH\\COOH\end{matrix}$$

Among the most useful monomers of the third group are the esters of long chain acids and unsaturated alcohol which correspond to the formula:

(9) $\quad R-COO-(CH_2)_p-C=CH$
$\quad\quad\quad\quad\quad\quad\quad\quad\quad | \quad |$
$\quad\quad\quad\quad\quad\quad\quad\quad\quad R' \; R'$ in which R represents a linear or branched chain alkyl and alkenyl group having 8 to 22 carbon atoms;
R' represents hydrogen or an alkyl radical having 1 to 5 carbon atoms;
p is a whole number equal to 0 or 1;

The esters of unsaturated acids according to the above Formula 8 and an alkyl alcohol comprising 8 to 18 carbon atoms or a lanolin alcohol;

Ethers corresponding to the formula:

(10) $\quad CH=C-(CH_2)_p-O-R$
$\quad\quad\quad\; | \quad |$
$\quad\quad\quad\; R' \; R'$ in which R represents a saturated or unsaturated linear or branched chain hydrocarbon radical having 2 to 18 carbon atoms, which may be hydroxylated or alkylated, and the carbon chain of which may comprise intermediate groups such as heteroatoms, such as oxygen, sulfur and nitrogen which form ether, thio and amino derivatives.
R' represents H or an alkyl radical having 1 to 5 carbon atoms;
p represents a whole number equal to 0 or 1;

And α-olefines having the formula:

(11) $\quad\quad\quad CH_2=CH-R$ in which R represents an alkyl radical comprising 4 to 18 carbon atoms.

Among the most useful monomers in the first group are: vinyl acetate, vinyl propionate, vinyl butyrate, methallyl acetate, methallyl propionate, methallyl butyrate, allyl acetate, allyl propionate, allyl butyrate, crotyl acetate, crotyl propionate, crotyl butyrate, methyl crotonate, butyl crotonate, octyl crotonate, ethyl vinylacetate, butyl allylacetate, hexyl allylacetate, ethyl allyloxy acetate, octyl allyloxy acetate, ethyl allylthio acetate, octylallyl thio acetate, ethyl allylamino acetate, octylallylamino acetate, diethyl allylmalonate, methyl undecyleneate, butyl crotyloxyacetate, ethyl methallyloxy acetate, ethyl vinyloxyacetate and ethyl β-hydroxy γ-allyloxy propyloxyacetate.

Among the most useful monomers in the second group are: 3-butenoic acid, 4-pentenoic acid, 10-undecenoic acid, allylmalonic acid, crotonic acid, allyloxyacetic acid, crotyloxyacetic acid, methallyloxyacetic acid, 3-allyloxypropionic acid, allylthioacetic acid, allylaminoacetic acid, vinyloxy acetic acid and β-hydroxy γ-allyloxypropyloxyacetic acid.

Among the most useful monomers in the third group are: vinyloctanoate, vinyl laurate, vinyl palmitate, vinyl stearate, vinyl isostearate, allyl laurate, methallyl laurate, allyl stearate, methallyl stearate, allyl isostearate, methallyl isostearate, allyl behenate, methallyl behenate, crotyl laurate, allyl oleate, oleyl crotonate, lanolin crotonate, lauryl vinylacetate, stearyl allylacetate, lauryl allyloxyacetate, lauryl allylthioacetate, lauryl allylaminoacetate, dioctyl allylmalonate, octyl undecylenate, cetyl-vinyl ether, stearylvinyl ether, lauryl-allyl ether, lauryl-methallyl ether, stearylcrotyl ether, 1-allyloxy-3-dodecyloxy-2-propanol, 1-allyloxy-3-dodecylthio-2-propanol, 1-hexene, 1-octene, 1-dodecene, 1-hexadecene, 1-octadecene, 1-eicosene, but this list is by no means exhaustive.

The copolymers of this embodiment of the invention may contain from 50 to 90% and preferably from 65 to 80% of monomers selected from the first group, about 5 to 25% and preferably from about 7 to 12% of monomers selected from the second group and about 5 to 30% and preferably about 10 to 20% of monomers of the third group. They may have their acid functions neutralized by means of mineral or organic bases in order to increase their solubility to facilitate their use in cosmetic compositions. They may be neutralized with a mineral or organic base, using for example, from 10 to 150% and preferably from 50 to 100% of the quanity of base required for stoichiometric neutralization with conventional cosmetic bases, such as monoethanolamine, diethanolamine, triethanolamine, isopropanolamines, and morpholine as well as the amino alcohols already known to neutralize polymers such as 2-amino, 2-methyl, 1-propanol, 2-amino, 2-methyl, 1,3-propanediol, etc.

The copolymers according to the invention may be prepared by copolymerization in a liquid, for example, in a solvent such as alcohol or benzene or by other known means. However, it is preferable to polymerize them in mass or in suspension.

The polymerization may be carried out in the presence of polymerization catalysts such as benzoyl peroxide, lauryl peroxide, azobisisobutyronitrile; the concentration of the catalyst may vary from 1 to 5% and preferably amounts to between 1.5 to 3% by weight of the monomers in the reaction.

The polymerization in suspension which makes it possible to obtain the copolymer in the form of beads, is carried out in water in the presence of a protective colloid such as polyvinyl alcohol, polyacrylic acid (sold under the trademark "Carbopol"), or hydroxyethylcellulose (sold under the trademark "Cellosize").

The concentrations of the protective product is such that its weight is, for example, from 0.06 to 1% of that of the monomers.

Another object of the invention is to provide as a new article of manufacture a cosmetic product characterized by the fact that it contains at least one copolymer as describe above which may be neutralized as indicated above, in solution in a suitable cosmetic vehicle.

The cosmetic product of this embodiment of the invention may be, for example, a hair lacquer, in liquid or aerosol form, a setting lotion, or simply a hair treating composition.

The composition may take the form of a solution, a gel, a cream, or a foam, or may be packaged in an aerosol dispenser.

By way of example an aerosol hair lacquer may be prepared by introducing from 1 to 4% of a copolymer according to the invention which may be neutralized into a mixture consisting of ¼ to ⅓ by weight of alcohol and ⅔ to ¾ by weight of a liquefied gas propellant under pressure.

A setting lotion according to the invention may be made, for example, by introducing into an aqueous or hydroalcoholic solution having a 0 to 70% alcohol content, a preferably neutralized copolymer according to the invention, in a quantity equal to from one to three percent by weight of the total weight of the solution.

The cosmetic compositions according to the invention may also contain conventional cosmetics additives such as plastifiers, perfumes, dyes, cationic products to facilitate combing, non-ionic products to insure peptization of the perfumes, urea to facilitate penetration into the fiber, silicones to improve the sheen, and other cosmetic resins.

In order that this embodiment of the invention may be better understood, several examples of the invention will now be described purely by way of illustration and examples.

EXAMPLES OF PREPARATION

EXAMPLE 51

Preparation of a copolymer in pellet form comprising 75% vinyl acetate, 10% 4-pentenoic acid, and 15% allyl stearate.

3.429 of an aqueous 1% solution of hydroxyethylcellulose sold under the trademark "Cellosize" is placed in a flask provided with agitating means, a reflux condenser, a thermometer, and a tube for introducing nitrogen.

After bubbling in nitrogen, the following mixture is introduced while agitation is continued:

|  | G. |
|---|---|
| Vinyl acetate | 1929 |
| 4-pentenoic acid | 257 |
| Allyl stearate | 386 |
| Azobisisobutyronitrile | 32.15 |

This is brought to reflux under a nitrogen atmosphere while being subjected to agitation. After about 8 hours polymerization is complete. The product is permitted to cool and dried. The result is a copolymer in granular form and a yield of 75%.

EXAMPLE 52

Preparation of a granular copolymer comprising 70% vinyl acetate, 10% pentenoic acid and 20% vinyl laurate.
The procedure is the same as in Example 51.
The result is a 72% yield of the desired copolymer in granular form.

EXAMPLE 53

Preparation of a granular copolymer comprising 75% vinyl acetate, 10% 3-butenoic acid, and 15% allyl stearate.
The procedure is the same as in Example 51.
The result is a 70% yield of the desired copolymer.

EXAMPLE 54

Preparation of a granular copolymer comprising 71.5% vinyl acetate, 8.5% 3-butenoic acid, and 20% vinyl laurate.
The procedure is the same as in Example 51.
The result is a 60% yield of the desired copolymer.

EXAMPLE 55

Preparation of a granular copolymer comprising 80% vinyl acetate, 10% 4-pentenoic acid, and 10% stearylvinyl ether.
The procedure is the same as in Example 51.
The result is an 80% yield of the desired copolymer.

EXAMPLE 56

Preparation of a granular copolymer comprising 71.5% vinyl acetate, 8.5% 4-pentenoic acid, and 20% vinyl laurate.
The procedure is the same as in Example 51.
The result is a 75% yield of the desired copolymer.

EXAMPLE 57

Preparation of a granular copolymer comprising 75% vinyl acetate, 10% crotonic acid, and 15% crotyl laurate.
The procedure is the same as in Example 51.
The result is a 60% yield of the desired copolymer.

EXAMPLE 58

Preparation of a granular copolymer comprising 75% vinyl acetate, 10% crotonic acid, 15% lanolin crotonate.
The procedure is the same as in Example 51.
The result is a 60% yield of the desired copolymer.

EXAMPLE 59

Preparation of a granular copolymer comprising 80% vinyl acetate, 10% crotonic acid, 10% stearylvinyl ether.
The procedure is the same as in Example 51.
The result is a 72% yield of the desired copolymer.

EXAMPLE 60

Preparation of a copolymer in lump form comprising 80% vinyl acetate, 10% crotonic acid and 10% 1-octene.

A mixture of the following monomers is introduced into a 500 cc. reactor provided with agitating means, a thermometer, a reflux condenser and a tube for introducing nitrogen:

|  | G. |
|---|---|
| Vinyl acetate | 160 |
| Crotonic acid | 20 |
| 1-octene | 20 |
| Benzoyl peroxide | [1] 2.35 |

[1] 85% pure.

This is heated to reflux while being agitated under a nitrogen atmosphere. The mixture thickens during polymerization and when polymerization is complete, after 5 to 6 hours, the polymer takes the form of a lump which is removed while warm.

After cooling, the end product is transparent, yellowish and may be ground up.

EXAMPLE 61

Preparation of a copolymer in lump form comprising 80% vinyl acetate, 10% crotonic acid and 10% 1-hexadecene.
The procedure is the same as in Example 60.
A quantitative yield of the desired copolymer results.

EXAMPLE 62

Preparation of a granular copolymer comprising 75% vinyl acetate, 10% crotonic acid and 15% allyl oleate.
The procedure is the same as in Example 51.
An 81% yield of the desired copolymer results.

EXAMPLE 63

Preparation of a granular copolymer comprising 75% vinyl acetate, 10% crotonic acid and 15% oleyl crotonate.
The procedure is the same as in Example 51.
The result is 70% yield of the desired copolymer.

EXAMPLE 64

Preparation of a granular copolymer comprising 80% vinyl acetate, 10% crotonic acid, 10% 1-allyloxy-3-dodecylthio-2-propanol.
The procedure is the same as in Example 51.
The result is a 74% yield of the desired copolymer in granular form.

EXAMPLE 65

Preparation of a granular copolymer comprising 80% vinyl acetate, 10% crotonic acid, 10% 1-allyloxy-3-dodecyloxy-2-propanol.
The procedure is the same as in Example 51.
The result is a 70% yield of the desired copolymer.

EXAMPLE 66

Preparation of a granular copolymer comprising 70% vinyl acetate, 10% crotonic acid, and 20% vinyl octanoate.
The precodure is the same as in Example 51.
The result is a 70% yield of the desired copolymer.

EXAMPLE 67

Preparation of a granular copolymer comprising 70% vinyl acetate, 10% crotonic acid, 10% allyl stearate, 10% vinyl stearate.
The procedure is the same as in Example 51.
The result is a 75% yield of the desired copolymer in granular form.

EXAMPLE 68

Preparation of a granular copolymer comprising 75% vinyl acetate, 10% allyloxyacetic acid, and 15% allyl stearate.

The procedure is the same as in Example 51.

The result is a 71% yield of the desired copolymer.

EXAMPLE 69

Preparation of a granular copolymer comprising 71.5% vinyl acetate, 8.5% allyloxy acetylacetic acid and 20% vinyl laurate.

The procedure is the same as in Example 51.

The result is a 73% yield of the desired copolymer.

EXAMPLE 70

Preparation of a bead or granular copolymer comprising 66.5% vinyl acetate, 8.5% crotonic acid and 25% vinyl laurate.

The procedure is the same as in Example 51, and a 72% yield of the desired copolymer is obtained.

EXAMPLE 71

Preparation of a copolymer in a single mass comprising 75% vinyl acetate, 10% allyloxyacetic acid, and 15% allyl laurate.

The following mixture of monomers is placed in 2500 ml. reactor equipped with agitating means, a thermometer, a reflux condenser, and a tube for introducing nitrogen.

|  | G. |
|---|---|
| vinyl acetate | 112.5 |
| allyloxyacetic acid | 15 |
| allyl laurate | 22.5 |
| benzoyl peroxide | 1.9 |

This heated to reflux under a nitrogen atmosphere. During the polymerization the mixture thickens. After 20 hours, polymerization ceases. Cooling, then results in a quantitative yield of a light yellow product which can be ground up.

EXAMPLE 72

Preparation of a copolymer in a continuous mass comprising 75% vinyl acetate, 10% allyl propionic acid, and 15% allyl stearate.

The procedure is the same as in Example 71.

A quantitative yield of the desired copolymer is obtained.

EXAMPLE 73

Preparation of a copolymer in the form a continuous mass comprising 71.5% vinyl acetate, 8.5% allyloxypropionic acid and 20% vinyl laurate.

The produced is the same as in Example 71.

An excellent yield of the desired copolymer is obtained.

EXAMPLE 74

Preparation of a copolymer in the form of a continuous mass comprising 75% vinyl acetate, 10% allyloxyacetic acid, 15% crotyl laurate.

The procedure is the same as in Example 71.

A quantitative yield of the desired copolymer is obtained.

EXAMPLE 75

Preparation of a copolymer in the form of a continuous mass which comprises 75% vinyl propionate, 10% crotonic acid, and 15% allyl stearate.

The procedure is the same as in Example 71.

A quantitative yield of the desired copolymer is obtained.

EXAMPLE 76

Preparation of a copolymer in the form a continuous mass which comprises 75% vinyl propionate, 10% allyloxyacetic acid, 15% allyl stearate.

The procedure is the same as in Example 71.

A quantitative yield of the desired copolymer is obtained.

EXAMPLE 77

Preparation of copolymer in the form of a continuous mass comprising 37.5% vinyl acetate, 37.5% vinyl propionate, 10% allyloxyacetic acid, 15% allyl stearate.

The procedure is the same as in Example 71.

A quantitative yield of the desired copolymer results.

EXAMPLE 78

Preparation of a granular copolymer comprising 70% vinyl acetate, 10% allyl acetate, 10% allyloxyacetic acid, and 10% allyl stearate.

The procedure is the same as in Example 71.

A 78% yield of the desired copolymer results.

EXAMPLE 79

Preparation of a copolymer in the form of a continuous mass comprising 77.5% vinyl acetate, 7.5% allyloxyacetic acid, and 15% allyl stearate.

The procedure is the same as in Example 71.

A quantitative yield of the desired copolymer results.

EXAMPLE 80

Preparation of a graunlar copolymer comprising 71.5% vinyl acetate, 8.5% 1-pentenoic acid, and 20% vinyl stearate.

The procedure is the same as in Example 71.

A 68% yield of the desired copolymer is obtained.

EXAMPLES OF APPLICATION

EXAMPLE 81

A solution having the following composition is prepared for use as an aerosol hair lacquer:

|  | G. |
|---|---|
| Copolymer described in Example 55 | 8 |
| Diisopropylamine | 0.693 |
| Perfume | 0.30 |
| Absolute ethyl alcohol q.s.p. | 100 |

25 g. of this solution is introduced into an aerosol bomb with 47 g. of the product sold under the trademark Freon 11 and 28 g. of the product sold under the trademark Freon 12.

When this is expelled as a spray it serves as a shiny non-hygroscopic lacquer.

EXAMPLE 82

A solution having the following composition is prepared for use as an aerosol hair lacquer:

|  | G. |
|---|---|
| Copolymer described in Example 55 | 6 |
| Diisopropylamine | 0.462 |
| Butyl palmitate | 0.25 |
| Perfume | 0.30 |
| Absolute ethyl alcohol, q.s.p. | 100 |

30 g. of this solution is introduced into an aerosol bomb together with 50 g. of the product sold under the trademark Freon 11 and 20 g. of the product sold under the trademark Freon 12.

This composition is particularly suitable for use as a hair lacquer.

EXAMPLE 83

A solution having the following composition is prepared for use as a setting lotion:

| Copolymer described in Example 52 | g | 1.8 |
|---|---|---|
| Triethanolamine, q.s.p. | pH | 7.4 |
| Ethyl alcohol, q.s.p. | deg | 50 |
| Water, q.s.p. | ml | 100 |

20 ml. of this solution is applied to hair which has been washed and dried. It is noted that the hair then combs easily when damp. After drying, the lacquer and sheen are excellent. It combs easily and has excellent resilience.

EXAMPLE 84

The following composition is prepared for use as a setting lotion:

| | | |
|---|---|---|
| Copolymer described in Example 54 | g | 2.5 |
| Triethanolamine, q.s.p. | pH | 7 |
| Ethyl alcohol, q.s.p. | deg | 60 |
| Water, q.s.p. | ml | 100 |

After application the results are excellent, particularly with respect to sheen, the absence of stickiness and manageability.

EXAMPLE 85

The following composition is prepared for use as a setting lotion:

| | | |
|---|---|---|
| Copolymer described in Example 53 | g | 1.5 |
| 2-amino-2-methyl-1,3-propanediol, q.s.p. | pH | 7.3 |
| Ethyl alcohol, q.s.p. | deg | 50 |
| Perfume | g | 0.1 |
| Water, q.s.p. | ml | 100 |

20 ml. of this solution is applied to bleached hair which has first been washed and dried.

The results are excellent from the point of view of softness, sheen and holding power, even in humid weather.

EXAMPLE 86

A setting lotion having the following composition is prepared:

| | | |
|---|---|---|
| Copolymer prepared as in Example 80 | g | 2 |
| Aminoethylpropanediol, q.s.p. 100% neutralization. | | |
| Cetavlon (cetyl trimethyl ammonium bromide) | g | 0.1 |
| Cetyl alcohol, q.s.p. | deg | 50 |
| Water, q.s.p. | cc | 100 |

The results obtained by applying this setting lotion are excellent. The lotion not only imparts body and resilience to the hair but also its sheen. No powder is left in the comb when the hair is combed. A perfert coating is applied to the hair, and it therefore holds a set much better than conventional setting lotions.

EXAMPLE 87

| | | |
|---|---|---|
| Copolymer prepared as in Example 70 | g | 2 |
| Aminoethylpropanediol, q.s.p. 100% neutralization. | | |
| Cetavlon | g | 0.1 |
| Cetyl alcohol, q.s.p. | deg | 50 |
| Water, q.s.p. | cc | 100 |

The results obtained are as satisfactory as in the case of Example 86.

EXAMPLE 88

| | | |
|---|---|---|
| Copolymer prepared according to Example 79 | g | 2 |
| Aminoethylpropanediol, q.s.p. 100% neutralization. | | |
| Cetavlon | g | 0.1 |
| Cetyl alcohol, q.s.p. | deg | 50 |
| Water, q.s.p. | cc | 100 |

The results obtained are as good as in the case of Example 86.

EXAMPLE 89

| | | |
|---|---|---|
| Copolymer prepared as in Example 72 | g | 2 |
| Aminoethylpropanediol, q.s.p. 100% neutralization. | | |
| Cetavlon | g | 0.1 |
| Cetyl alcohol, q.s.p. | deg | 50 |
| Water, q.s.p. | cc | 100 |

This lotion imparts holding power to the hair, and especially an attractive sheen. The hair is rendered soft to the touch and easy to untangle. This type of lotion is particularly suitable for sensitive or dried out hair.

EXAMPLE 90

A solution having the following composition is prepared:

| | | |
|---|---|---|
| Copolymer prepared as claimed in Example 73 | g | 2 |
| Aminoethylpropanediol, q.s.p. 100% neutralization. | | |
| Cetavlon | g | 0.1 |
| Cetyl alcohol, q.s.p. | deg | 50 |
| Water, q.s.p. | cc | 100 |

The results obtained are as satisfactory as those described in Example 89.

EXAMPLE 91

An aerosol lacquer having the following composition is prepared:

| | G. |
|---|---|
| Copolymer prepared as in Example 71 | 4 |
| 2-amino-2-methyl-1,3-propanediol, q.s.p. 100% neutralization. | |
| Perfume | 0.3 |
| Absolute alcohol, q.s.p. | 100 |

25 g. of this solution is packaged in an aerosol bomb with 47 g. of the product sold under the trademark Freon 11 and 28 g. of the product sold under the trademark Freon 12.

EXAMPLE 92

An aerosol hair lacquer is produced by preparing a solution having the following composition:

| | G. |
|---|---|
| Copolymer prepared as in Example 74 | 8 |
| 2-amino-2-methyl-1,3-propanediol, q.s.p. 100% neutralization. | |
| Perfume | 0.25 |
| Absolute alcohol q.s.p. | 100 |

25 g. of this solution is packaged in an aerosol bomb with 47 g. of the product sold under the trademark Freon 11 and 28 g. of the product sold under the trademark Freon 12.

A very strong lacquer results.

EXAMPLE 93

In order to prepare an aerosol hair lacquer, a solution having the following composition is prepared:

| | G. |
|---|---|
| Copolymer prepared in accordance with Example 77 | 4 |
| 2-amino-2-methyl-1,3-propanediol, q.s.p. 100% neutralization. | |
| Butyl myristate | 0.2 |
| Perfume | 0.10 |
| Absolute alcohol, q.s.p. | 100 |

30 g. of this solution is packaged in an aerosol bomb with 35 g. of the product known under the trademark Freon 11 and 35 g. of the product sold under the trademark Freon 12.

When sprayed on the hair a shiny lacquer having a strong lacquering power is obtained.

EXAMPLE 94

In order to produce an aerosol hair lacquer, a solution having the following composition is prepared:

| | G. |
|---|---|
| Copolymer prepared according to Example 27 | 4 |
| Absolute alcohol, q.s.p. | 100 |

25 g. of this solution is packaged in an aerosol bomb with 47 g. of the product sold under the trademark Freon 11 and 28 g. of the product sold under the trademark Freon 12.

When this is sprayed on the hair a tough, shiny, coating of lacquer is formed thereon.

EXAMPLE 95

The following composition formed a cream setting lotion:

| | |
|---|---|
| Copolymer of 77.5% vinyl acetate, 7.5% allyloxy acetic acid, 15% allyl stearate _____g__ | 2 |
| Aminomethyl propane diol. q.s.p. 100% neutralization _____pH__ | 7 |
| Carbopol 940 (carboxypolymethylene) _____g__ | 0.4 |
| Triethanolamine _____g__ | 0.5 |
| Ethyl alcohol q.s.p. _____deg__ | 20 |
| Water, q.s.p. _____g__ | 100 |

What is claimed is:

1. A wave setting lotion composition comprising, in an aqueous alcohol solution containing 20 to 50% of ethyl alcohol, 1 to 3% by weight of a salt of an amine base selected from the group consisting of ammonia, mono-, di- and tri-ethanolamine, monoethylamine, dimethylamine, diethylamine, aminoethylamine, monoisopropanolamine, 2-amino 2-methyl propanol-1, 2-amino 2-methyl propanediol-1,3 and morpholine, and a copolymer, said copolymer being constituted by
   (a) 75-85 weight percent vinyl acetate;
   (b) 5-15 weight percent crotonic acid, and
   (c) 5-15 weight percent of a compound selected from the group consisting of
      (1) ester having the formula

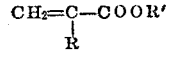

in which R is selected from the group consisting of hydrogen and methyl and R' is selected from the group consisting of methyl, butyl, ethylhexyl, butoxy ethyl and lauryl, and
      (2) ether having the formula $$CH_2=CH-OR''$$

in which R'' is selected from the group consisting of ethyl, isopropyl, butyl, isobutyl and chloroethyl.

2. The composition of claim 1 in which said ester is selected from the group consisting of methyl acrylate, butyl acrylate, ethyl hexyl acrylate, lauryl acrylate, methyl methacrylate, butyl methacrylate, butoxyethyl methacrylate, lauryl methacrylate and said ether is selected from the group consisting of isopropyl vinyl ether, isobutyl vinyl ether and chloroethyl vinyl ether.

3. An aerosol hair lacquer composition consisting essentially of 25 to 33 parts of an alcohol selected from the group consisting of ethanol and isopropanol, 66 to 75 parts of an aerosol propellant selected from the group consisting of trichlorofluoromethane, dichlorofluoromethane and their mixtures and 1 to 4% by weight of a salt of an amine base selected from the group consisting of ammonia, mono-, di- and triethanolamine, monoethylamine, dimethylamine, diethylamine, aminoethylamine, monoisopropanolamine, 2-amino 2-methyl propanol-1,2-amino 2-methyl propanediol-1,3 and morpholine, and a copolymer, said copolymer being constituted by:
   (a) 75-85 weight percent vinyl acetate,
   (b) 5-15 weight percent crotonic acid, and
   (c) 5-15 weight percent of a compound selected from the group consisting of
      (1) ester having the formula

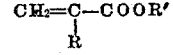

in which R is selected from the group consisting of hydrogen and methyl and R' is selected from the group consisting of methyl, butyl, ethylhexyl, butoxy ethyl and lauryl and
      (2) ether having the formula $$CH_2=CH-OR''$$

in which R'' is selected from the group consisting of ethyl, isopropyl, butyl, isobutyl and chloroethyl.

References Cited

UNITED STATES PATENTS

| | | | |
|---|---|---|---|
| 2,996,471 | 8/1961 | Reiter et al. | 424—47 |
| 3,258,443 | 6/1966 | Cantor et al. | 260—80.8 X |
| 3,282,879 | 11/1966 | Werner | 260—80.8 X |
| 3,484,420 | 12/1969 | Chihara | 260—80.8 |
| 3,503,916 | 3/1970 | Warson et al. | 260—80.8 X |
| 3,577,517 | 5/1971 | Kubot et al. | 424—47 |

JEROME D. GOLDBERG, Primary Examiner

V. C. CLARKE, Assistant Examiner

U.S. Cl. X.R.

8—127.51; 132—7; 260—78.5 UA, 80.75, 80.76, 80.8; 424—Digest 1 and 2, 711